J. E. PERRAULT.
MEANS FOR CUTTING RINGS AND WASHERS FROM RUBBER TUBING.
APPLICATION FILED OCT. 9, 1919.
1,348,316.
Patented Aug. 3, 1920.
2 SHEETS—SHEET 1.
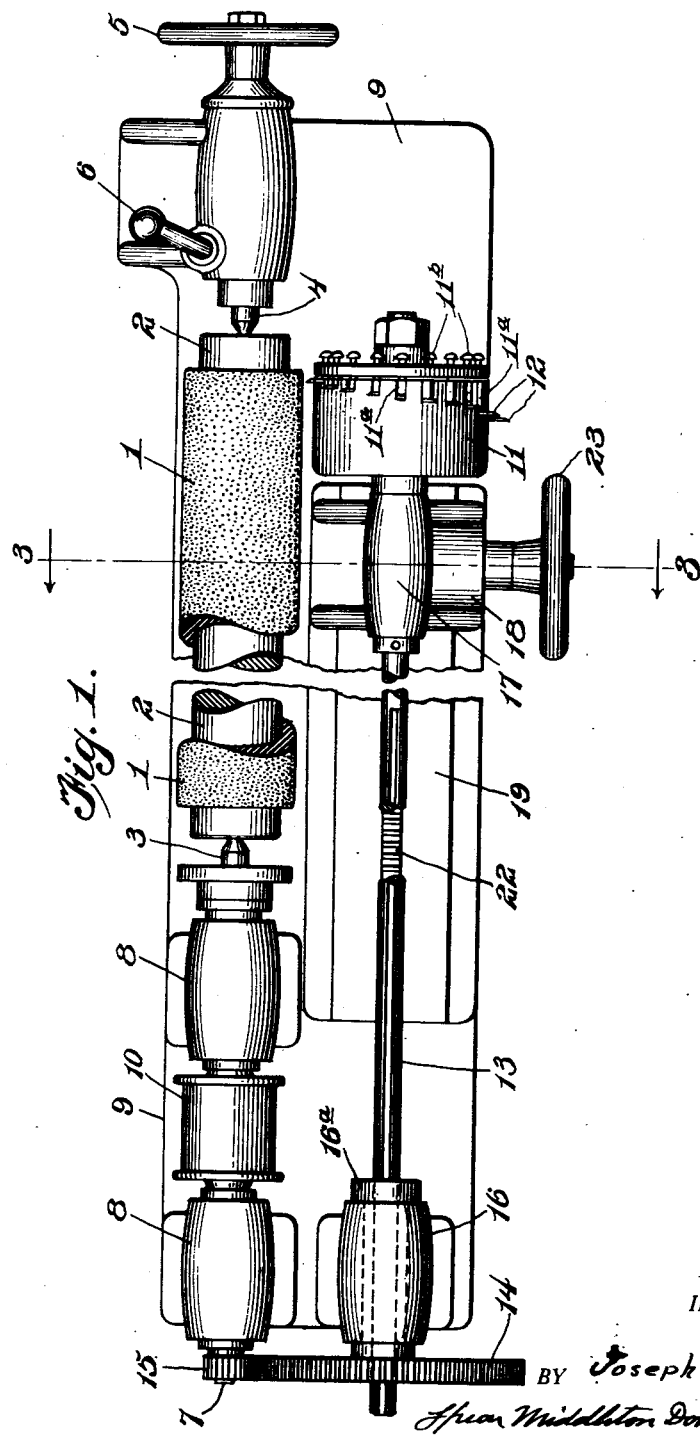
INVENTOR.
BY Joseph E. Perrault
ATTORNEY.

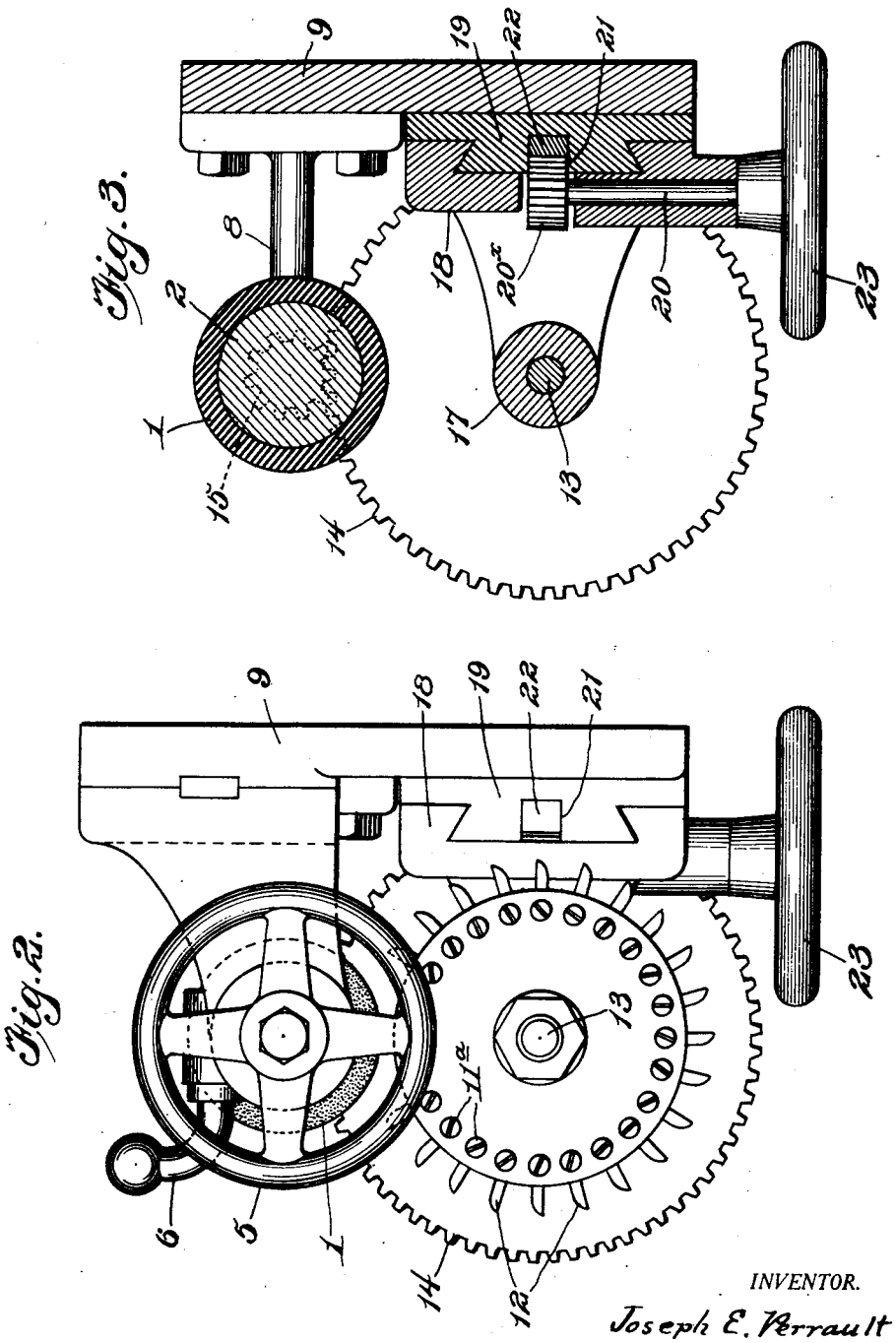

UNITED STATES PATENT OFFICE.

JOSEPH E. PERRAULT, OF WATERTOWN, MASSACHUSETTS, ASSIGNOR TO HOOD RUBBER COMPANY, OF WATERTOWN, MASSACHUSETTS, A CORPORATION OF MASSACHUSETTS.

MEANS FOR CUTTING RINGS AND WASHERS FROM RUBBER TUBING.

1,348,316. Specification of Letters Patent. Patented Aug. 3, 1920.

Application filed October 9, 1919. Serial No. 329,486.

*To all whom it may concern:*

Be it known that I, JOSEPH E. PERRAULT, a citizen of the United States, and resident of Watertown, Massachusetts, have invented certain new and useful Improvements in Means for Cutting Rings and Washers from Rubber Tubing, of which the following is a specification.

My present invention relates to improvements in devices and methods of cutting rubber packing rings or washers from rubber tubing and aims to provide a method and means which will cut such rings in a rapid and expeditious manner, and further to produce apparatus which will operate effectively upon the thick tubing necessary to produce wide rings.

With these and other objects in view the invention includes the new method and novel features of construction and arrangement and combination of parts hereinafter described and particularly defined by the appended claims.

An embodiment of my invention is illustrated in the accompanying drawings in which—

Figure 1 is a plan view showing my improved apparatus, partly broken away, and

Fig. 2 is an end elevation.

Referring by reference characters to this drawing the numeral 1 designates the rubber tubing from which the packing rings or washers are to be formed. The tubing 1 being cut is placed upon a roll or mandrel 2 which is rotatably supported by suitable means such as a driving head 3 or chuck 3 and an adjustable member or center 4 which may be moved in or out to clamp or release the mandrel by the hand wheel 5, being locked in position by the clamping device 6.

The head or chuck 3 is carried by a shaft 7 journaled in bearings 8 supported from the base plate 9, upon which the member 4 is also slidably supported, the shaft being provided between these bearings with a band pulley 10 as a convenient means for rotating the shaft and therewith the mandrel and tube.

Located adjacent the mandrel and with its axis parallel to the axis thereof is a cutter head 11 which has a plurality of spaced knives or cutting blades 12 projecting radially therefrom, said knives being arranged in a spiral path about the cutter head. Each blade is offset, axially of the cutter head, from each preceding blade a distance corresponding to the desired thickness of packing rings. The blades may conveniently be seated in recesses $11^a$ in the head and held therein by set screws $11^b$.

The knives or blades project sufficiently far to cut completely through the rubber tubing, the knives acting successively due to the fact that the mandrel and tubing are rotated much more rapidly than is the cutter head, the relative speed being such that the tubing is cut throughout its complete circumference by each knife during its period of proximity.

A convenient manner of rotating the cutter head is to mount the same on a shaft 13 which carries a large spur gear 14 at one end which meshes with a small spur gear 15 fast on shaft 7.

As it is desirable to sever the rings from tubing of considerable length I provide means by which the cutter head may be intermittently moved after each complete rotation and the consequent severing of a number of rings corresponding to the number of blades or knives.

A convenient means of effecting this is to provide a fixed bearing at the end remote from the cutter, and a slidable bearing 17 adjacent the cutter, the slidable bearing being supported by a guide member 18 engaging a guideway 19 on the base. A shaft 20 extending through the guide 18 carries a gear $20^x$ which projects into a groove 21 in the guideway and engages a rack 22 therein. Shaft 20 is provided with a hand wheel 23 which may be rotated and through the rack and gear described, effect the movement of the guide on the guideway. The shaft 13 is held against longitudinal movement relative to bearing 17 by collars at each end, and as the hand wheel is turned the shaft 13 will be slid toward and through the stationary bearing, carrying with it the cutter head.

The shaft has a spline connection with a bearing sleeve $16^a$ journaled in the bearing 16, to which sleeve the gear 14 is rigidly connected.

In order to permit the shifting of the cutter head after the cutting of one set of rings a gap is left in the knives which leaves all the knives out of contact with the rubber tubing as shown in Fig. 2.

The arrangement of knives operating as above described preserves a solid union with the main body of the tube to and until the time when each knife in turn separates a washer from the tube. The cutters are spaced sufficiently far apart to allow thin rings to be cut with the attendant spreading due to the entering of the knife, and allow the stock to regain its natural position before it can be injured or cut by the following knife.

While I have disclosed herein only a single cutter head, it is obvious that a plurality or multiple number of these may be used in a single machine if desired.

Having thus described my invention what I claim is:—

1. In combination, a support for a tube or roll of material with means for rotating it, and a juxtaposed cutter head having a plurality of spirally arranged knives with means for continuously rotating said cutter head to cause said knives to gradually and successively enter and leave the tube or roll.

2. In combination, a support for a tube or roll of material, a juxtaposed cutter head having a plurality of radially projecting knives arranged in a spiral path, and means for rotating said support and cutter head continuously but at relatively different rates of speed.

3. In combination, a support for a tube or roll of material, a juxtaposed cutter head having a plurality of radially projecting knives arranged in a spiral path, means for continuously rotating said support and cutter head at different rates of speed, and means for shifting said cutter head in an axial direction.

4. In combination, a support for a tube or roll of material, with means for rotating it, a juxtaposed cutter head rotatably mounted on an axis parallel to the axis of said roll, a plurality of radially projecting knives carried by said cutter head, said knives being spaced from each other and arranged in a spiral path, and means for imparting a continuous rotation to said cutter head throughout a single complete rotation.

5. In combination, a support for a tube or roll of material to be cut with means for rotating it, and a juxtaposed cutter head slidably mounted on an axis parallel to the axis of the roll and having a plurality of spirally arranged knives, and means for rotating said cutter head continuously throughout a single revolution.

6. In combination, a rotatable support for a tube or roll of material to be cut, means for rotating the same, a plurality of spirally arranged knives mounted to rotate about an axis parallel to the axis of said tube or roll, and means for imparting a continuous speed of rotation to said cutter head.

7. In combination, a support for a tube or roll of material with means for rotating it, a juxtaposed cutter head having a plurality of spirally arranged knives located in different planes, means for rotating said cutter head continuously throughout a single complete rotation, said knives being spaced sufficiently close to cause a plurality of them to simultaneously engage the tube material, said spirally arranged knives occupying but a part of the complete circumference of the cutter head whereby a space is left to permit longitudinal shifting of the cutter head with relation to the tube support while the knives are out of contact with the tube material.

8. In combination, a cylindrical mandrel to receive a tube or roll of rubber composition, means for rotating the same, a cutter head slidably mounted on an axis parallel to the axis of the roll, a plurality of spirally arranged slicing knives carried by said cutter head arranged to successively approach into close proximity to the surface of the mandrel, and means for imparting a continuous rotary movement to said cutter head through a single revolution whereby said knives are caused to gradually advance into and leave the tube material in successive planes, the knives being so spaced from each other that a plurality of knives are acting on the tube material at a given time.

9. A method of cutting packing rings from a tube of plastic material which consists in rotating the tube material and successively slicing it in a plurality of planes, each slicing action progressing gradually from the exterior to the interior of the material and each successive slicing action beginning before the preceding slicing action has been completed.

10. The method of cutting a layer of rubber on parallel lines which consists in causing a series of cutting knives to gradually and successively enter the material on different planes, each succeeding knife being caused to enter the material before the preceding cutter has left it.

In testimony whereof, I affix my signature.

JOSEPH E. PERRAULT.